United States Patent [19]

Kettenis et al.

[11] Patent Number: 5,302,909
[45] Date of Patent: Apr. 12, 1994

[54] NON-LINEAR SIGNAL PROCESSOR

[75] Inventors: Jeroen M. Kettenis; Laurens Doornhein, both of Eindhoven, Netherlands

[73] Assignee: U.S. Philips Corporation, New York, N.Y.

[21] Appl. No.: 823,929

[22] Filed: Jan. 22, 1992

[30] Foreign Application Priority Data

Jan. 24, 1991 [EP] European Pat. Off. ........ 91200136.9

[51] Int. Cl.$^5$ ............................ H03K 5/00; H03B 1/00
[52] U.S. Cl. .................................. 328/167; 328/163; 307/520
[58] Field of Search ............... 328/167, 163, 165; 358/138; 307/520, 521

[56] References Cited

U.S. PATENT DOCUMENTS

| | | | |
|---|---|---|---|
| 3,969,678 | 7/1976 | Asahara et al. | 328/167 |
| 4,011,438 | 3/1977 | Aufderheide et al. | 328/167 |
| 4,015,209 | 3/1977 | Meyer-Ebrecht | 328/167 |
| 4,031,462 | 6/1977 | Bouvier et al. | 328/167 |
| 4,357,549 | 11/1982 | Miller | 328/167 |
| 4,682,060 | 7/1987 | Ulriksson et al. | 328/167 |
| 4,949,177 | 8/1990 | Bannister et al. | 358/138 |
| 4,979,228 | 12/1990 | Rzeszewski | 358/138 |
| 5,019,903 | 5/1991 | Dougall et al. | 358/138 |
| 5,138,452 | 8/1992 | Soloff | 358/138 |

FOREIGN PATENT DOCUMENTS 0360509  3/1990  European Pat. Off. .
0396229  11/1990  European Pat. Off. .

*Primary Examiner*—Timothy P. Callahan
*Attorney, Agent, or Firm*—Jack D. Slobod

[57] ABSTRACT

An image is sampled at a given sampling frequency. For each original sample at least one additional sample delayed relative to the first sample is generated (12, 14, 16). The original samples are non-linearly processed (18) and the additional samples are non-linearly processed (20) independently of the processing (18) of the original samples. The output signals from the two processing stages are downsampled (22) back to the original sampling frequency and are metered if required for correcting the overall amplitude and phase vs. frequency characteristic.

4 Claims, 3 Drawing Sheets a b

NON-LINEAR SIGNAL PROCESSOR

BACKGROUND OF THE INVENTION

1. Field of the Invention

The present invention relates to non-linear signal processing and, in particular, to the removal of undesired harmonics created by such processing.

2. Description of the Related Art

The present invention will be discussed with reference to video signal processing in TV receivers but is not limited to that field. It has wide applicability wherever signal samples are subjected to non-linear processing, as, again for example, in the medical instruments field.

In TV receivers, efforts to improve video images, have, in the recent past, concentrated to a considerable extent on improving the perceived image by decreasing or eliminating line flicker and field flicker. When the television picture is an interlaced picture these problems have been attacked in two basic ways. First, to eliminate line flicker, additional lines are interpolated between consecutive lines in each field. This converts the TV images from an interlaced format to a progressive scan. To remove the field or frame flicker, fields are interpolated between the consecutive fields by utilizing data from one or the other original raster, or both, combined non-linearly by, for example, a median filter. Non-linear filters are also used for filtering in the horizontal direction, e.g. for increasing the perceived image resolution. An example of use of a median filter for field interpolation is shown in EP-A-0,192,292 (FIG. 7).

Since use of the vertical median filters still causes distortion in the video picture, an analysis of the problem was undertaken with the following result. For a non-orthogonal picture pattern as illustrated in FIG. 1a, the original signal components in the vertical and horizontal direction are illustrated in FIG. 1b and FIG. 1c, respectively. Use of a median filter in the vertical direction will result in a signal pattern as illustrated in FIG. 1d. A similar artefact will be created in the horizontal direction, as illustrated in FIG. 1e. Uneven harmonics have been created, of which the third harmonic is by far the strongest.

The above-mentioned harmonics constitute a first order effect which, however, is not as disturbing as a second order effect resulting from the beat frequency or alias components between the above-mentioned odd harmonics and the frequency at which the signal is sampled in the horizontal direction, for example to permit digital signal processing. As shown in FIG. 1f, if a signal having a third harmonic component is sampled at three times the fundamental frequency, a DC level shift will occur, thus changing the average luminance value of the signal.

A realistic example of a situation in which this kind of beat frequency can occur is the following. A PAL video signal includes undesired remainders of the color subcarrier at 4.43 MHz which form a diagonal pattern. The third harmonic of this pattern will be at 13.3 MHz. If now this signal is sampled in the horizontal direction at 13.5 MHz, the resulting beat frequency will be 200 KHz. If the color carrier traces extend over the whole picture, a pattern having 10 periods per line results, which is very disturbing.

The problem arises because the sampling frequency is chosen so that the frequency spectrum of the video signal extends to ½ of the sampling frequency. This results in the greatest economy with respect to required memory and also in the lowest operating speed. Thus signal components of ⅓ of the sampling frequency may well lie within the spectrum of the video signal.

In general, a solution to this problem has been to increase the sampling frequency so that the spectrum of the video signal remains well below ⅓ of the sampling frequency. This is not an economical solution since, for example, the capacity of the field memories or frame memories has to be increased by 50% and circuits have to operate at the higher frequency.

SUMMARY OF THE INVENTION

It is inter alia an object of the present invention to decrease or remove the distortions mentioned above, without incurring the cost inherent in use of an overall higher sampling frequency.

According to one aspect of the invention, a television signal processing apparatus which receives television signal samples sampled at a given sampling frequency and which are to be processed by non-linear processing means, is characterized in that upsampling means are provided for upsampling the received television samples to create higher frequency signal samples prior to application to the non-linear processing means. Further, downsampling means are coupled to the non-linear processing means for downsampling the output signal thereof back to the given sampling frequency.

These and other aspects of the invention will now be described in greater detail by way of example for a preferred embodiment with reference to the accompanying drawings.

DETAILED DESCRIPTION OF THE PREFERRED EMBODIMENTS

Figure 1:
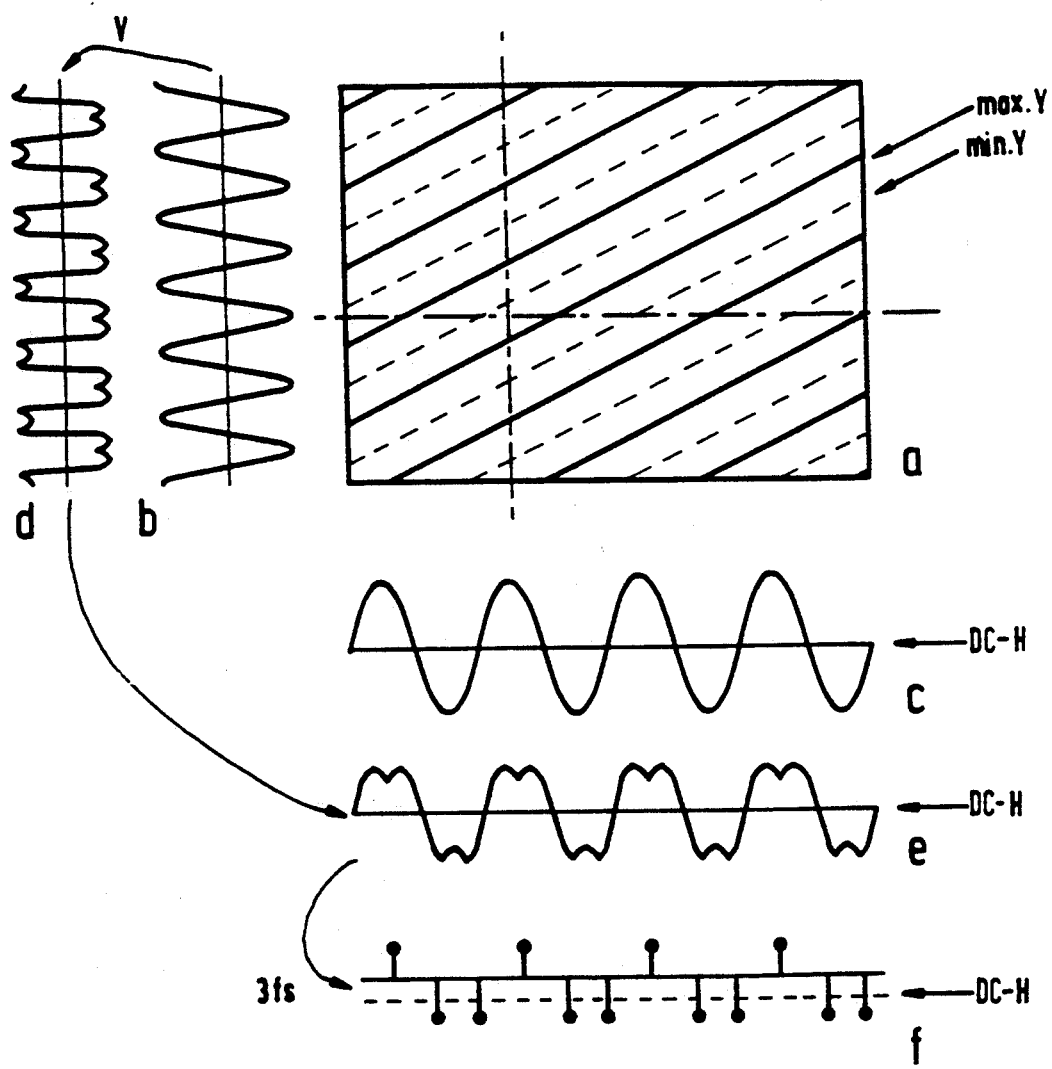
FIG. 1 is a waveform diagram illustrating the problem to be solved.

The cause of the problem to be solved by the present invention was discussed above with reference to FIG. 1. Direct implementation of the proposed solution, namely using a local upsampling to, for example, a factor of 2 would require a second clock having twice the frequency of the standard clock. Also, the median filter would have to operate at twice the normal frequency, which may be a very difficult requirement to implement. Thus, according to the invention, a standard median filter is replaced by upsampling units 12, 14 and 16, one for each input 1, 2, 3, two median filters 18 and 20, and downsampling stage 22. Median filter 18 processes the odd samples, while median filter 20 processes the even samples. Median filters 18 and 20 thus each operate at the standard or conventional frequency. The outputs of the two median filters are combined in the downsampling stage 22 which furnishes an output at the conventional sampling frequency.

Figure 3:
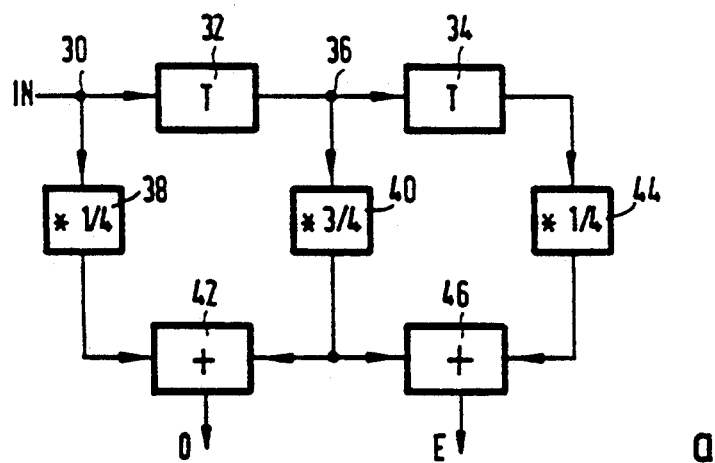
FIG. 3 is a schematic block diagram of upsampling (a) and downsampling (b) filters for use in the present invention.
Figure 3:
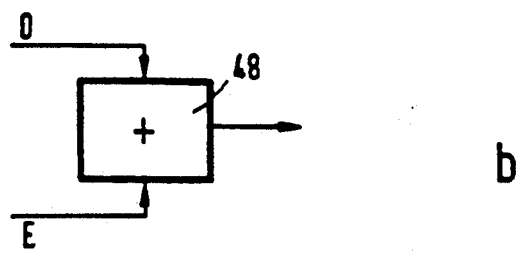

Identical upsampling filters 12, 14 and 16 are shown in greater detail in FIG. 3a. Input terminal 30 is connected to a first delay 32 which is connected to a second delay 34 at a common point 36. The incoming samples, multiplied by a factor of ¼ in a multiplier 38, are combined with the previous sample, namely the sample at terminal 36, multiplied by a factor of ¾ in a multiplier 40, by addition in an adder 42 which furnishes odd output samples. The even samples are similarly obtained by addition of the sample at common point 36 multiplied by a factor of ¾ to the twice delayed sample at the output of delay 34 multiplied by ¼ in multiplier 44, the addition taking place in an adder 46 at whose output the even samples appear. Thus for every input at terminal 30 an odd and even output are created, i.e. the frequency is doubled.

Referring again to FIG. 2, the odd outputs of stages 12, 14 and 16 are applied to respective inputs of the odd median filter 18, while the even outputs of upsampling stages 12, 14 and 16 are connected to respective inputs of even median filter 20. The combined output of the filters 18 and 20 is thus an output at twice the conventional frequency. The output signals of filters 18 and 20 are, as mentioned above, downsampled in downsampling stage 22.

A preferred downsampling stage as illustrated in FIG. 3b is a stage 48 in which the odd and even values are averaged so that the signal at the output of stage 48 is a video signal at the conventional sampling frequency.

The upsampling stages described above are simplified for clarity and may not, per se, result in a sufficient suppression of artefacts. A more effective approach is to design the upsampling filters which furnish the "odd" and "even" sample series in such a way that, at the frequency of most of concern (here ⅓ the sampling frequency) the third harmonics at the output of the filters have the same amplitude and a phase relationship of 180°. When the signals are then combined, artefacts of the dominant frequency of FS/3 will be suppressed.

Figure 4:
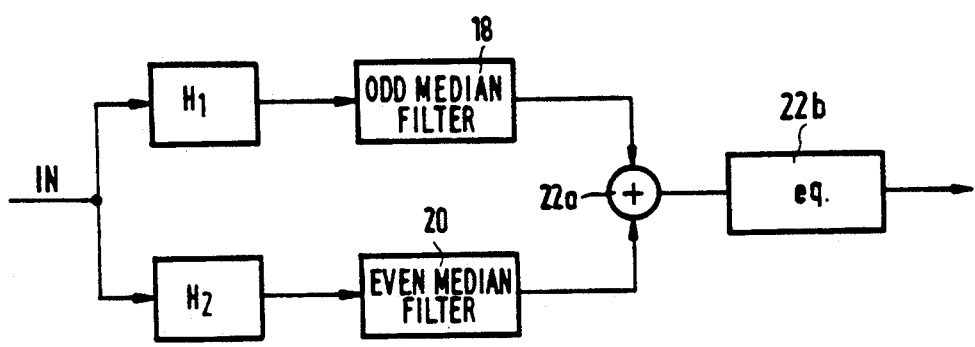
FIG. 4 is a block diagram illustrating the basis of a second embodiment of the invention.

The required circuitry to accomplish the above is derived as follows. Referring to FIG. 4, the video signal sampled at a frequency fs is applied via a terminal IN to respective stages $H_1$ and $H_2$. The latter are followed respectively, by non-linear filters 18 and 20, which may be median filters. The outputs of the non-linear filters 18 and 20 are summed by an adder 22a, and thereafter applied to an equalizer 22b.

The following conditions must be met:
1) the gain in both paths, at the base frequency on which the non-linear filter generates the harmonic to be suppressed, must be equal,
2) the $i^{th}$ harmonic of (fs/i), that is generated in the non-linear filters, in the two signal paths must be applied to the adder in opposite phase. For equal amplitudes:

$$|H_1(fs/i)| = |H_2(fs/i)|$$

Condition 2 above can be met if the difference in delay between $H_1$ and $H_2$ is a half sample time at the frequency fs/i. This means that a signal at frequency fs/i is applied to the non-linear filters with a ½ $T_{sample}$ delay between their respective inputs. The generated harmonics at the outputs of the non-linear filters will therefore also have a ½ $T_{sample}$ delay difference. As the generated harmonics i * (fs/i)=fs, which were to be suppressed have a ½ $T_{sample}$ delay with respect to each other, these two filter-outputs are in opposite phase for fs.

For a preferred embodiment:

$H_1(z) = 1$ (i.e. H, has no associated delay);

$H_2(z) = K(1 + z^{-1})$ ($H_2$ has a delay of Ts/2 at all frequencies). K is a parameter used to obtain:

$$|H_2(fs/i)| = |H_1(fs/i)| = 1$$

for the harmonic i to be cancelled. It can be shown that K=1 if the third harmonic is cancelled.

Figure 2:
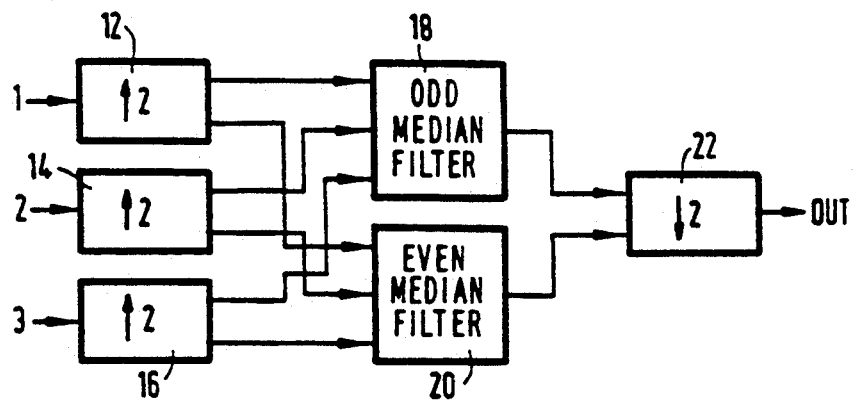
FIG. 2 is a block diagram illustrating a median filter with upsampling and downsampling according to the present invention.
Figure 5:
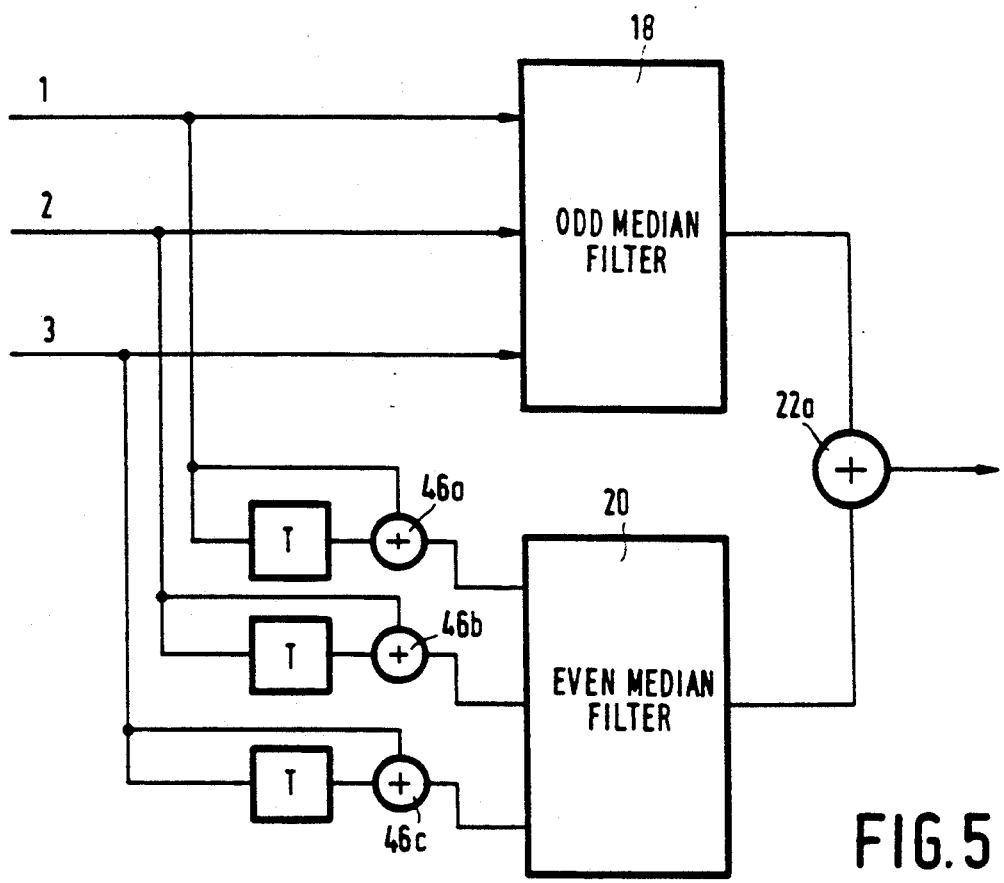
FIG. 5 is a schematic block diagram of a second embodiment of a filter with upsampling according to the present invention.

The resultant circuitry is illustrated in FIG. 5. Here the odd samples are the original samples i.e. the inputs 1, 2 and 3 of upsampling stages 12, 14 and 16 in FIG. 2 are directly connected to the inputs of the odd median filter 18 of FIG. 5. The inputs of median filter 20 are derived from a filter with 1,1 coefficients, i.e. the direct and once delayed samples at each input are summed in respective adder stages 46a, 46b and 46c before being applied to the respective inputs of even median filter 20. The outputs of filters 18 and 20 are summed in an output summing stage 22a.

Figure 6:
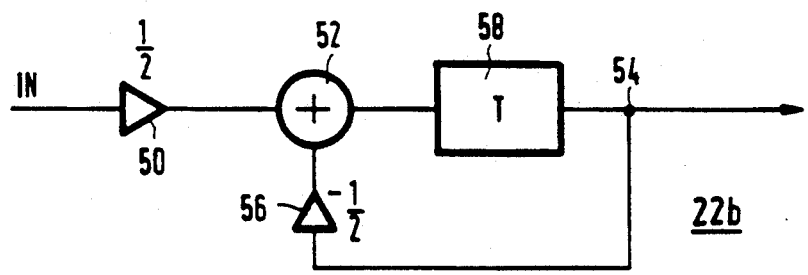
FIG. 6 is a frequency response correction filter.

Computer simulations show that the third harmonic, as expected, is completely suppressed. However, the overall gain of the arrangement illustrated in FIG. 4 is not equal to 1 and, furthermore, the frequency characteristic is not flat. For correction, the equalizing filter 22b illustrated in FIG. 6 may be connected to the output of summing stage 22a. As illustrated in FIG. 6, it consists of a divider 50 which divides the incoming signal by a factor of 2. The output of divider 50 is applied to a summing stage 52 whose second input is connected to the filter output 54 by means of a second divider 56 in which the output signal is divided by a factor of 2 and phase shifted by 180°. The output of summing circuit 52 is connected by a one-sample interval delay 58 with output 54. This correction filter has the inverse characteristic of ($H_1 + H_2$) and therefore equalizes both gain and phase changes resulting therefrom.

The present invention has been illustrated by a particular example in the video signal processing field. It should be noted that the local upsampling followed by processing and subsequent downsampling is applicable to many circuits in which alias is otherwise created by the beat between sampling frequencies and undesired signal components resulting, e.g. from imperfect filtering. Other applications will therefore readily occur to one skilled in the art, as will different embodiments of the upsampling and downsampling stages and frequency correction filters if required. All of the above form part of the present invention and are encompassed in the following claims.

We claim:

1. Method for removing at least one undesired harmonic created by non-linear processing of sequential sets of received signal samples having a given sample frequency, comprising: delaying each of the signal samples in a set of said received signal samples by a predetermined delay time thereby creating a delayed signal sample, combining each delayed signal sample with a corresponding received signal sample to create combined signal samples, processing the sequential sets of received signal samples non-linearly to create a processed output signal having said undesired harmonic, processing the sets of combined signal samples non-linearly and independently of the processing of the sets of received signal samples to produce a second processed output signal having said undesired harmonic of the same amplitude and opposite phase of said undesired harmonic in said first processed output signal, and combining said first processed output signal and said second processed output signal to form a final output signal not having the undesired harmonic.

2. Apparatus for processing signal samples sampled at a given sampling frequency, said apparatus comprising:
first and second input stages coupled to receive said signal samples, said first and second input stages having equal transfer function moduli at a predetermined fraction of said given sampling frequency, a processing delay of said first input stage differing from a processing delay of said second input stage by half a sampling period of said signal samples at said predetermined fraction of said given sampling frequency;
first and second non-linear filters coupled to said first and second input stages, respectively; and
combining means coupled to said first and second non-linear filters.

3. Apparatus as claimed in claim 2, further comprising equalizing filtering means coupled to said combining means.

4. Apparatus as claimed in claim 2, wherein said predetermined fraction is ½.

* * * * *